(No Model.) 2 Sheets—Sheet 2.
G. PFANNKUCHE.
APPARATUS FOR INDICATING THE STRENGTH OF THE CURRENT IN AN ELECTRIC CIRCUIT.
No. 404,860. Patented June 11, 1889.
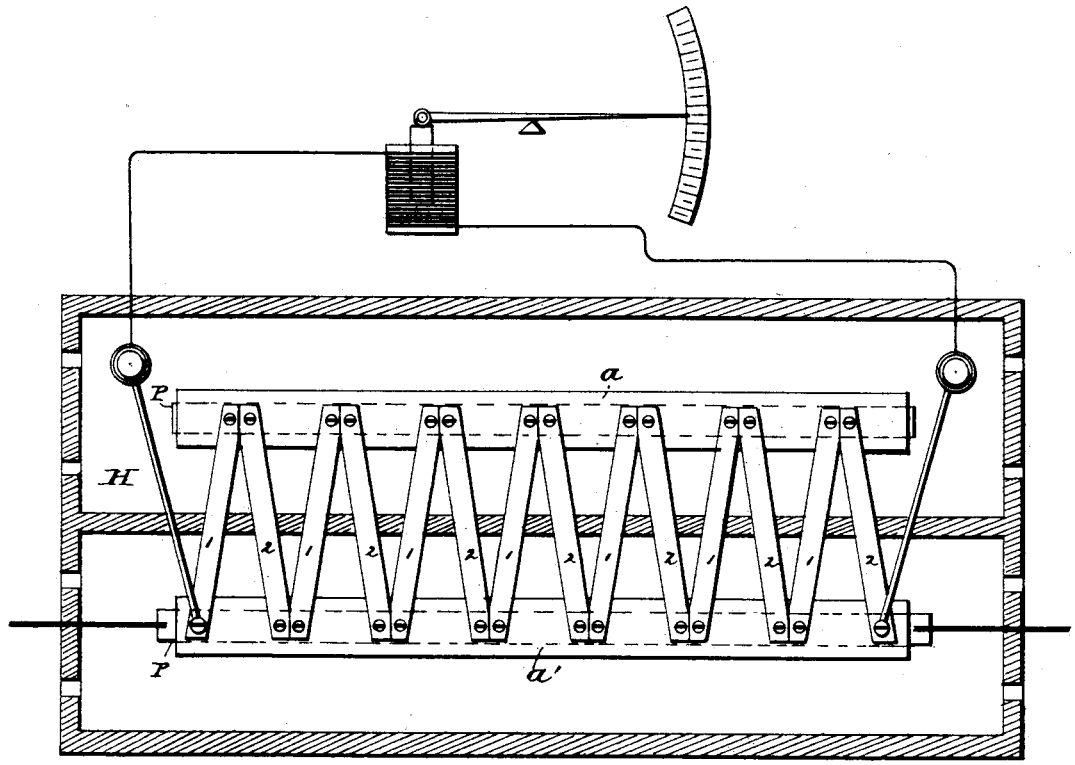

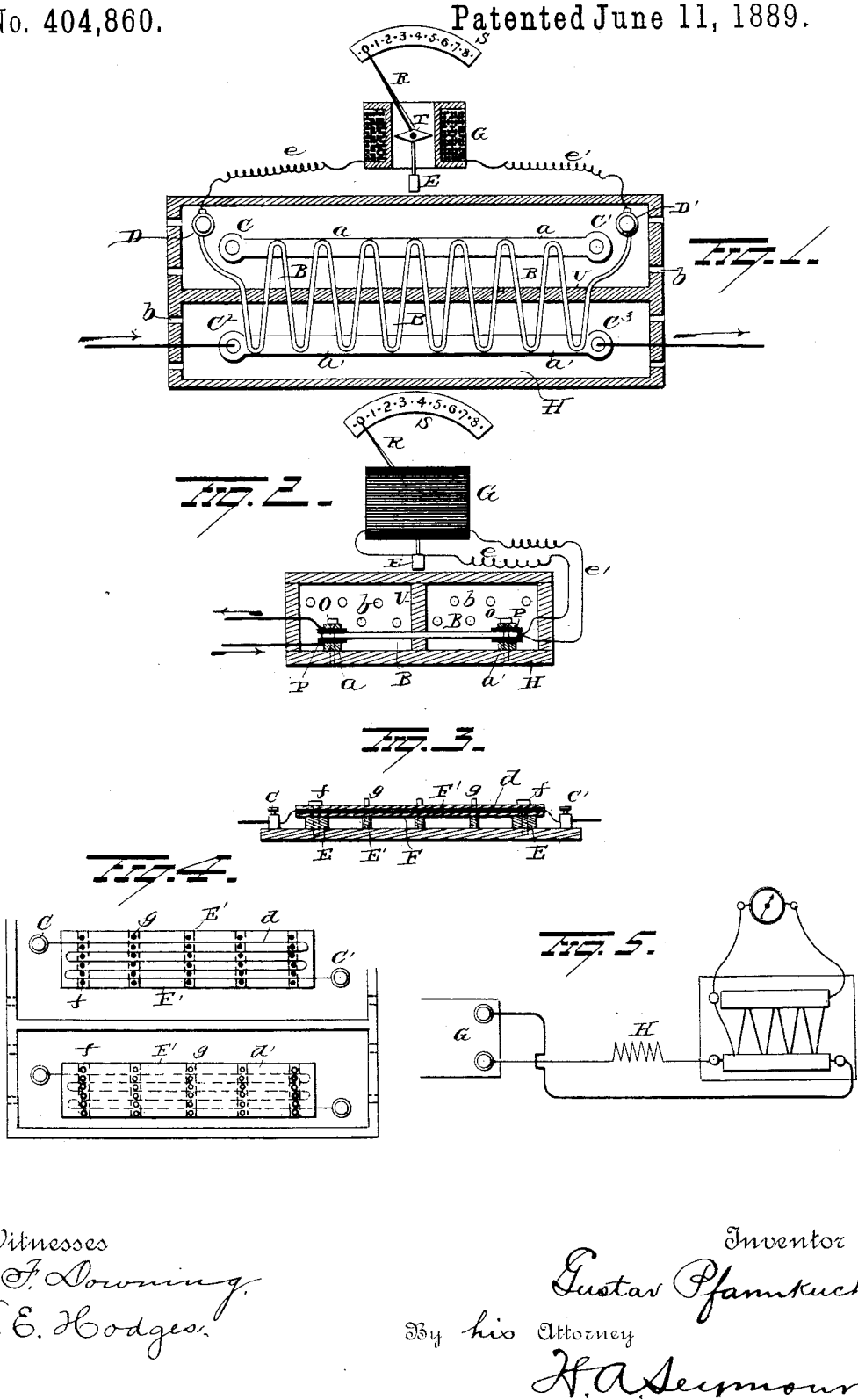

UNITED STATES PATENT OFFICE.

GUSTAV PFANNKUCHE, OF CLEVELAND, OHIO, ASSIGNOR TO THE BRUSH ELECTRIC COMPANY, OF SAME PLACE.

APPARATUS FOR INDICATING THE STRENGTH OF THE CURRENT IN AN ELECTRIC CIRCUIT.

SPECIFICATION forming part of Letters Patent No. 404,860, dated June 11, 1889.

Application filed December 15, 1888. Serial No. 293,711. (No model.)

*To all whom it may concern:*

Be it known that I, GUSTAV PFANNKUCHE, of Cleveland, in the county of Cuyahoga and State of Ohio, have invented certain new and useful Improvements in Indicators for Indicating the Strength of the Current in an Electric Circuit; and I do hereby declare the following to be a full, clear, and exact description of the invention, such as will enable others skilled in the art to which it appertains to make and use the same.

My invention relates to an indicator for indicating the strength of the current in an electric circuit or for indicating the difference of potential existing between two points in a circuit, the object of the invention being to provide convenient, effective, and reliable apparatus for determining the strength of an electric current, whether it be continuous, alternating, pulsating, or intermitting, and to accomplish this without employing the direct application or use of the current to be measured in actuating the indicating apparatus.

With these objects in view my invention consists in the combination, with any suitable galvanometer or other indicating apparatus, of a suitable thermal battery or thermo-pile, constructed and arranged to be included in a circuit of the current to be measured, whereby the latter is utilized for heating the alternate joints of the thermal battery or thermo-pile, and thus generate a current, which is indicated by the galvanometer.

My invention further consists in certain features of construction and combinations of parts, as will be hereinafter described, and pointed out in the claims.

In the accompanying drawings, Figure 1 is a diagrammatic view, in side elevation, of one form of apparatus embodying my invention. Fig. 2 is a similar view in cross-section of the same; and Figs. 3, 4, and 5 illustrate a modification. Fig. 6 is an enlarged plan view of the apparatus.

H is the base-board of the instrument, and is made of wood or other suitable material. On the base-board are placed the bars $a$ $a'$, which are made of any suitable form and dimensions and composed of German silver or other suitable conducting metal or metals. Between the bars $a$ $a$ and $a'$ $a'$ are inserted the alternate joints of the thermo-pile or thermo-spiral B B, the joints being insulated from the bars by thin plates P, of mica or other suitable insulating material. The bars, insulating-plates, and thermo-spiral are secured together and to the base-board H by means of insulated bolts or screws O. The German silver bars $a$ are provided at their ends with the terminals C C', while the bars $a'$ are provided with end terminals $C^2$ $C^3$.

G represents a galvanometer, which may be of any preferred type or construction, and is provided with an index R, arranged to move forward and backward over a scale S, the index R being fixed to a needle T, to which latter is secured a vane E. The galvanometer is included in the circuit of the thermo-spiral B B by means of the conductors $e$ $e'$, which connect the helix of the galvanometer with the terminals D D' of the thermo-spiral, which latter, as stated, may be of any suitable form or material.

The parts of the apparatus, excepting the galvanometer, are inclosed in the box and completely covered and concealed thereby. The sides or other portions of the box are provided with perforations $b$, for the purposes of ventilation. The box is furnished with a longitudinal partition U, dividing the interior of the box into two compartments, in one of which is located the bars $a$ $a$ and the joints of the thermo-spiral that connect therewith, while in the other compartment is located the bars $a'$ $a'$ and the joints of the thermo-spiral that are connected with them. The partition serves to prevent the heat of bar $a'$ from communicating or being transmitted to the bar $a$.

In the operation of the apparatus the current to be measured or a portion of it is first converted into a thermo-electric current, the thermo-pile standing in the same relation to the main circuit as a converter, the primary coil of the thermo-pile being represented by the heating bar or device through which the current to be measured is passed. As is well known, variations of heat applied to the alternate joints of a thermo-pile produce variations in the current generated or produced by the thermo-pile, so that the variations of current to be measured are indicated by the variations in the strength of the thermo-electric current.

My improved apparatus is preferably constructed so that when no current is passing through the heating wire or rod the two sets of alternating joints of the pile are of exactly the same temperature, and hence when no current is passing through the device the galvanometer will always point to zero.

Upon the passage of current through the bar $a'$, to the terminals of which are connected the ends of the circuit in which the current is to be measured, the bar will commence to heat, and the heat will increase as the current to be measured increases in quantity, the temperature of the bar $a'$ varying with the varying quantity of current passing through it, and as the difference of temperature of the bars $a$ $a'$ varies such variations will be indicated by the deflections of the galvanometer, so that the latter operates to indicate and serve as a measure of the current passing through the bar $a'$. The bars $a$ $a'$ are made of the same material, and are uniform in size and shape and in every way, so that the temperature of the alternate joints of the thermo-pile when no current is passing through the instrument will always be the same, regardless of what the temperature in the containing box or room in which the apparatus is placed may be. In view of the well-known fact that the difference of potential of a thermo-pile depends for given material and construction only on the difference of temperature of its alternate joints it follows that the instrument's readings must always be correct, no matter whether the outside temperature be high or low, and it is by the varying strengths of the thermo-electric current which act upon and are recorded by the galvanometer that I am enabled to measure the strength of the current in a circuit without employing the current itself as the direct agency for actuating the device.

When the apparatus is to be employed to measure the difference of potential between the points of a circuit, the bars $a$ $a'$ are replaced by series of high-resistance wires $d$ $d'$, as illustrated in Figs. 3, 4, and 5.

In Fig. 3 I have illustrated a vertical section of one of the series of high-resistance wires. Fig. 4 is a transverse section showing plan views of two series of high-resistance wires, the covering-strips of mica being removed from one series to show the disposition of the wire; and Fig. 5 is a diagrammatic view of the voltmeter in the circuit of a dynamo or other electric generator.

E represent blocks of insulating material, on which are supported the thin rectangular strips of mica F, which latter are supported at points between the insulating-blocks E by the supports E', attached to the base-board. On the mica strips are disposed the fine platinum or German-silver wire $d$ $d'$, which are arranged in spirals or folds, the ends of the wires being secured to the terminals C C'. On the upper side of the high-resistance wires $d$ $d'$ are laid thin rectangular strips of mica F', which are secured in place by clamps or bolts $f$. Small pins $g$ of insulating material are inserted through holes formed in the mica strips and into the supports E and E', and serve to retain the folds of the high-resistance wire against displacement, and prevent the folds of the wire from coming in contact with one another. The thermo-spiral is placed on the top of the mica strip just as in the ammeter, hereinbefore described.

Fig. 5 is a diagrammatic view of the improved voltmeter in the circuit of a dynamo or other electric generator G, a resistance H being included in the circuit of the machine.

Fig. 6 is an enlarged plan view of the apparatus, the strips or bars 1 being composed of antimony and the strips or bars 2 of bismuth, or any other suitable metal may be used. The bars or strips 1 2 are connected at one end with the electric conductor $a'$, and are connected at their opposite ends with a bar $a$. The adjacent ends of the bars 1 and 2 are soldered together or otherwise connected. The joints formed between the adjacent ends of the bars or strips 1 and 2, connected to bar $a'$, are known as "hot joints," while the joints connected with bar $a$ are known as "cold joints." This figure represents one of an almost innumerable number of different constructions of thermo-spirals or thermo-piles that might be employed in carrying my invention into effect.

As it is evident that many changes in the construction and relative arrangement of parts might be resorted to without departing from the spirit and scope of my invention, I would have it understood that I do not restrict myself to the particular construction and arrangement of parts shown and described; but Having fully described my invention, what I claim as new, and desire to secure by Letters Patent, is—

1. In a current-indicator, the combination, with a thermo-pile or thermo-spiral, of an electric conductor combined therewith, said conductor constructed and adapted to be included in an electric circuit and be heated by the current flowing therein, whereby the heat thus generated will be transmitted to the alternate joints of the thermo-pile, substantially as set forth.

2. In a current-indicator, the combination, with a conductor adapted to be included in the circuit of a current to be measured, of a thermo-pile or thermo-spiral having its alternate joints connected with said conductor so as to be heated thereby, the other joints of the thermo-pile or thermo-spiral being exposed to the atmosphere, substantially as set forth.

3. In a current-indicator, the combination, with a conductor adapted to be included in the circuit of a current to be measured, of a thermo-pile or thermo-spiral arranged with part of its joints exposed to the heat of said conductor and another portion of its joints located in a separate compartment, substantially as set forth.

4. In a current-indicator, the combination, with a thermo-pile or thermo-spiral and a conductor arranged to transmit heat to the alternate joints of the thermo-pile or thermo-spiral, said conductor adapted to be included in the circuit of the current to be measured, of a galvanometer included in the circuit of the thermo-pile or thermo-spiral, substantially as set forth.

5. In a current-indicator, the combination, with a suitable box or receptacle and a partition dividing the box or receptacle into two compartments, of a thermo-pile arranged within the box with part of the joints in one compartment and a part in the other compartment and a conductor adapted to be included in the circuit of a current to be measured, said conductor being located within one of said compartments and arranged to transmit heat to the thermo-pile joints located in the same compartment therewith, substantially as set forth.

6. In a current-indicator, the combination, with a ventilated box or receptacle and a thermo-pile located therein, of a conductor arranged to transmit heat to the alternate joints only of said thermo-pile, said conductor being adapted to be included in the circuit of the current to be measured, and a galvanometer electrically connected to the terminals of the thermo-pile, substantially as set forth.

7. In a current-indicator, the combination, with the thermo-spiral, of the conducting-bars secured to the alternate joints of the thermo-spiral and insulated therefrom, and a galvanometer electrically connected to the terminals of the thermo-spiral, substantially as set forth.

In testimony whereof I have signed this specification in the presence of two subscribing witnesses.

GUSTAV PFANNKUCHE.

Witnesses:
W. A. PALLANT,
W. D. POST.